United States Patent [19]

Lazaratos

[11] Patent Number: 5,999,489
[45] Date of Patent: Dec. 7, 1999

[54] HIGH VERTICAL RESOLUTION CROSSWELL SEISMIC IMAGING

[75] Inventor: Spyridon K. Lazaratos, Houston, Tex.

[73] Assignee: TomoSeis Inc., Houston, Tex.

[21] Appl. No.: 08/820,885

[22] Filed: Mar. 21, 1997

[51] Int. Cl.[6] .................................................... G01V 1/40
[52] U.S. Cl. ................................ 367/57; 367/58; 367/59; 367/50; 367/73
[58] Field of Search .................................. 367/57, 58, 59, 367/50, 73, 56, 38, 49

[56] References Cited

U.S. PATENT DOCUMENTS 5,144,590 9/1992 Chon .......................................... 367/57
5,742,560 4/1998 Krebs ........................................ 367/50

OTHER PUBLICATIONS

Jerry M.Harris (Lattice parameterization for tomography) 1992).
Lazaratos et al (Crossingwell seismic imaging of reservoir changes caused by CO2 injection).
Spyridon K. Lazaratos and Bruce P. Marion; "Crosswell seismic imaging of reservoir changes by $CO_2$ injection"; Nov. 1996; Expanded abstracts of annual international meeting of the society of exploration geophysicists.
Jerry M. Harris; "Lattice Parameterization for Tomography"; May 1993; Annual report of seismic tomography project, department of geophysics, Stanford University.
Jerry M. Harris; "An approach to adaptive gridding for traveltime tomography"; Jun. 1994; Annual report of seismic tomography project, department of geophysics, Stanford University.

Primary Examiner—Christine K. Oda
Assistant Examiner—Anthony Jolly
Attorney, Agent, or Firm—Mike Pritzau; Steve Shear

[57] ABSTRACT

A method for producing high vertical resolution seismic images from crosswell data is disclosed. In accordance with one aspect of the disclosure, a set of vertically spaced, generally horizontally extending continuous layers and associated nodes are defined within a region between two boreholes. The specific number of nodes is selected such that the value of a particular characteristic of the subterranean region at each of the nodes is one which can be determined from the seismic data. Once values are established at the nodes, values of the particular characteristic are assigned to positions between the node points of each layer based on the values at node within that layer and without regard to the values at node points within any other layer. A seismic map is produced using the node values and the assigned values therebetween. In accordance with another aspect of the disclosure, an approximate model of the region is established using direct arrival traveltime data. Thereafter, the approximate model is adjusted using reflected arrival data. In accordance with still another aspect of the disclosure, correction is provided for well deviation. An associated technique which provides improvements in ray tracing is also disclosed.

48 Claims, 6 Drawing Sheets

HIGH VERTICAL RESOLUTION CROSSWELL SEISMIC IMAGING

This invention was made with Government support under STTR Grant No. DE-FG02-943486019 awarded by the Department of Energy. The Government has certain rights in this invention.

BACKGROUND OF THE INVENTION

The present invention relates generally to crosswell seismic imaging and more particularly to a method for producing high vertical resolution tomograms in a crosswell imaging environment by utilizing a node/layer model of a subterranean region of ground.

In fields such as geophysics and geology, the knowledge of the subsurface structure of the ground is useful, for example, in the selection of potential well sites and in fault studies. In the past, a number of different seismic imaging or tomography methods have been implemented with the goal of rendering images which impart such knowledge of the subsurface geologic structure. One such method, which is commonly referred to as crosswell imaging also known as transmission tomography, will be described immediately hereinafter.

Figure 1:
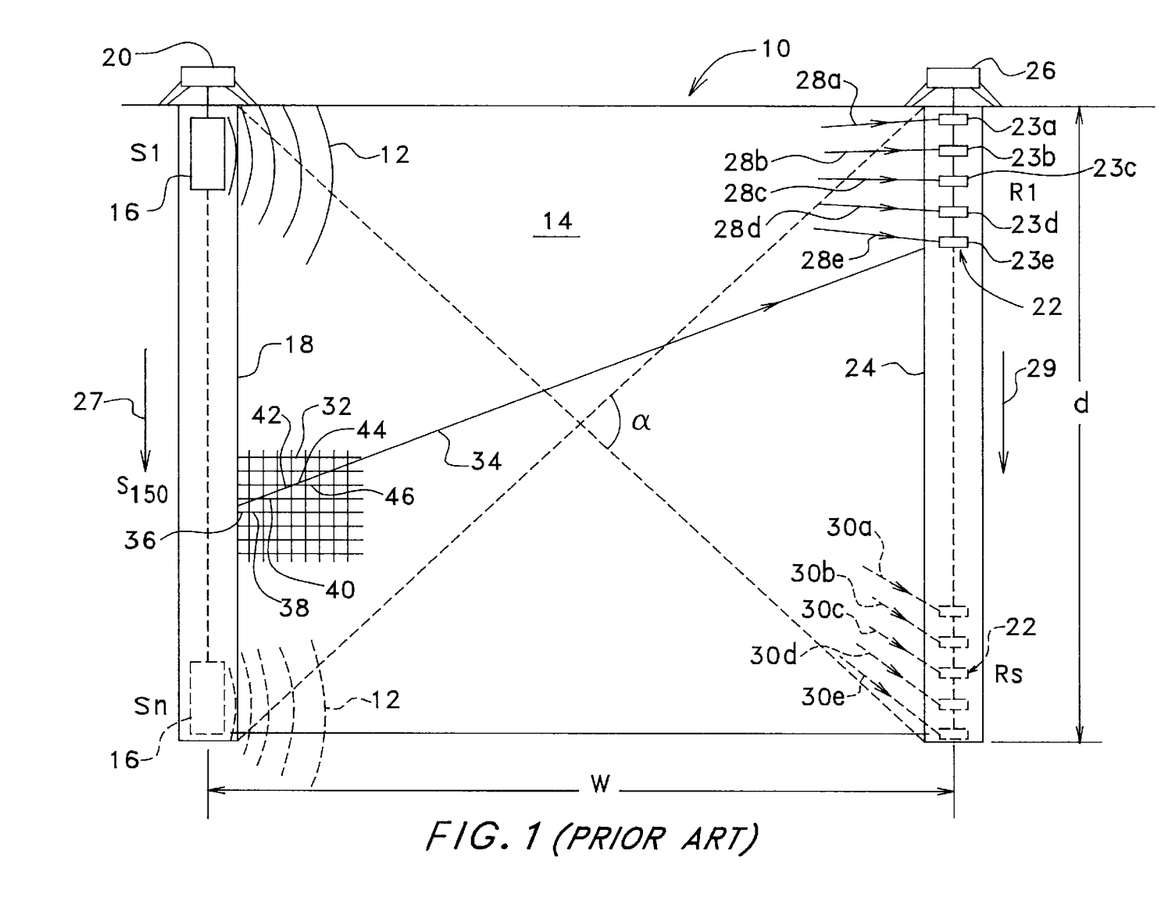
FIG. 1 is cross-sectional view in elevation of a subterranean region extending between two boreholes and illustrating a prior art method of generating a seismic velocity image.

Turning immediately to FIG. 1, crosswell imaging is typically performed using a crosswell imaging system which is generally indicated by the reference numeral 10. In system 10, seismic energy 12 is transmitted through a subsurface region 14 of the ground using a source 16 which is positioned in a first borehole 18. In state of the art systems, source 16 typically transmits seismic energy 12 into region 14 in the form of a swept frequency signal (chirp) which covers a predetermined frequency range. Source 16 is selectively movable between a series of positions $S_1$ through $S_N$ using a winch and cable arrangement 20 wherein source 16 is shown initially at $S_1$, adjacent the surface of region 14, and is shown in phantom at SN, adjacent the bottom of borehole 18. In order to properly couple source 16 with the subsurface surrounding first borehole 18, source 16 is typically immersed in a liquid or mud (neither of which is shown) which is either present or introduced into borehole 18. It should be noted that the subsurface structure of the ground being imaged is not illustrated in the present figure for purposes of clarity.

Still referring to FIG. 1, seismic energy 12 passes through region 14 and is received by a receiver array 22 which is positioned within a second borehole 24. Like source 16, receiver array 22 is normally immersed in some medium (not shown) for coupling the seismic energy from the ground to the receiver array and, further, is selectively movable between positions $R_1$ through $R_s$ using a winch and cable arrangement 26 wherein receiver array 22 is initially shown at $R_1$, adjacent the surface of region 14 and is shown in phantom at $R_s$, adjacent the bottom of borehole 24. It should be appreciated that the subterranean region of interest may comprise a zone (not shown for purposes of simplicity) which is at a known depth below the surface. In this case, the source and receiver array positions are adjusted accordingly such that the positions are spaced across the zone of interest rather than extending all the way to the surface. Receiver array 22 is made up of any suitable number of receivers such as, for example, five receivers 22a–e to record seismic energy 12 at five vertically spaced positions which are, of course, locationally dependent upon the overall position (one of $R_1$ through $R_s$) of the receiver array. It is noted that the first and second boreholes are illustrated as being perfectly vertically oriented for purposes of simplicity. Deviation of these boreholes from the perpendicular direction is typically referred to as well or borehole deviation. Inasmuch as borehole deviation is a concern with regard to portions of the remaining discussions, it will be addressed at appropriate points below.

During the operation of imaging system 10, a series of source scans is performed in each of which source 16 transmits seismic signal 12 in sequence from positions $S_1$ through SN with receiver array 22 located at one of the positions selected from $R_1$ through $R_s$. In one method for completing the source scans, receiver array 22 is initially located at $R_1$ during a first source scan. This first source scan begins with source 16 transmitting from $S_1$ such that seismic signal 12 propagates through region 14 and is received at $R_1$, as illustrated by raypaths 28a–e which are associated with each of receivers 22a–e. Raypaths are commonly used in the art as an expedient in describing the propagation of a wavefront through some medium wherein the raypath representation is perpendicular to the actual wavefront at any particular point therealong. For purposes of simplicity, raypaths illustrated in FIG. 1 are shown as being straight. However, it is recognized that specific subsurface structural features such as, for example, stratifications, often result in raypaths which are not straight and that energy propagated along any of these raypaths, whether straight or curved, is readily detected by receiver array 22. It is further recognized with regard to raypaths that seismic energy propagates along each raypath, as defined between source 16 and a respective receiver (one of 23a–e), at some average velocity which is dependent upon the structural features and velocity characteristics of the materials that are encountered along the overall length of the raypath. This average velocity is normally considered in terms of a "traveltime" which is associated with each raypath. Traveltimes are categorized in terms of particular characteristics of their associated seismic wave types. In the particular instance of seismic waves that travel from source to receiver without being reflected or converted to another wave type, traveltimes are referred to as direct arrival as contrasted with, for example, reflected (non-direct) arrival. One of skill in the art will recognize that direct and reflected arrival traveltimes may be individually separated from the overall seismic data record using known techniques.

Continuing to refer to FIG. 1 and as the scanning operation continues, source 16 is moved/scanned in the direction indicated by an arrow 27 to successive source positions up to and including $S_N$ such that data is recorded for each of positions $S_1$ through $S_N$ with the receiver array located at $R_1$. Next, receiver array 22 is moved in the direction indicated by an arrow 29 to position $R_2$ (not shown) and source 16 is returned to position $S_1$ at which time the source scan is repeated in the aforedescribed manner wherein seismic signal 12 is transmitted from each of positions $S_1$ through $S_N$ so as to complete a second source scan corresponding to receiver position $R_2$. The inception of the final source scan (performed with receiver array 22, shown in phantom, at Rs) is illustrated wherein source 16 initially transmits from $S_1$ to $R_S$. When compared with the $S_1$–$R_1$ transmission, it is noted that the $S_1$–$R_S$ transmission produces raypaths 30a–e which, relative to the other raypaths, most closely approach a vertical direction through region 14. The significance of such "more vertically oriented" raypaths will be described in detail at an appropriate point below in conjunction with a discussion of characteristics of the seismic data record which are recognized by the present invention. For the moment, however, it is sufficient to note that the maximum vertical orientation of raypaths within region 14 is directly related to an aperture angle α which is defined, as illustrated, by the depth d of boreholes 18 and 24 in conjunction with a distance w by which the boreholes are separated. A final source scan is completed with the source/receiver positions Sn–Rn. It is noted that this operation may be performed in any number of different ways so long as measurements are obtained between each receiver position (within the overall receiver array) and each source position so as to produce a seismic data record which is representative of region 14.

The seismic data record, in and by itself, represents a relatively complex, rather large body of information. For example, a typical seismic data record may be obtained using two hundred different source transmission positions ($S_1$ through $S_N$, above) in combination with two hundred different receiver positions (i.e., forty different positions of receiver array 22) yielding forty thousand possible straight raypaths through the region of interest. Crosswell imaging contemplates the use of this data in a way which produces a seismic velocity map that is intended to represent the subsurface structure within the region of interest based on the principle that different material layer types exhibit different seismic velocities. More specifically, by measuring the time of arrival of the seismic energy along any given path (direct or indirect) and knowing the path length, the average velocity traveled by the seismic energy along its path can be determined. However, the usefulness of any particular velocity map is related to its resolution and accuracy. Moreover, any velocity map should preferably be readily correlated with other forms of seismic records which are in popular use such as, for example, sonic well logs. In the past, various approaches have been taken for using the seismic data record in attempting to produce such images. In each of these approaches, the region of interest must be mathematically modeled in such a way that the seismic data record may be applied to the model. Thus, the model, at least initially, forms the basis for the image which is produced by a respective approach to the problem.

Still referring to FIG. 1 and in one particular modeling approach, region 14 is divided into relatively small areas which are referred to as pixels 32. For purposes of clarity, only pixels within one portion of region 14 are illustrated. However, it is to be understood that pixels 32 cover the entirety of the region. Typically, each pixel 32 is square in form and is assumed to be homogeneous with regard to its seismic properties such as wave propagation velocity. Thus an equation may be expressed for any raypath through region 14 in the form:

$$t = d_1/v_1 + d_2/v_2 + \ldots + d_n/v_n \quad (1)$$

wherein t is the known direct arrival traveltime for a particular raypath which is obtained directly from the seismic data record, n represents the number of pixels which the raypath transverses, $d_1$ through $d_n$ represent the incremental distances across the individual pixels along the raypath and $v_1$ through $v_n$ represent the corresponding seismic velocity within each pixel along the ray path. It should be appreciated that the $d_1$ through $d_n$ numerator values may readily be obtained since the pixel locations are known and since, for an assumed straight raypath between particular source and receiver positions, the endpoints of the raypath are known. However, it is appropriate to now mention that well deviation should be considered in determining raypath lengths, which influences t, so as to ensure accuracy of the formulated equation. Further discussion will be directed to the subject of well deviation where appropriate.

As a particular example of the development of a raypath equation, a raypath 34 is shown which extends from an exemplary source position $S_{150}$ directly to receiver 23e with receiver array 22 located at position $R_1$ such that distances d are defined within pixels 36 (d1), 38 (d2), 40 (d3), 42 (d4), 44 (d5), 46 (d6), etc. As noted values are readily obtained and the associated traveltime t is known leaving only $v_1$ through $V_n$ as unknown values within equation 1. In this manner, a system of equations, each of which is in the form of equation 1, may be set up based on any number of known direct arrival traveltimes and associated raypaths. The system may then be solved to yield the pixel velocity values using known mathematical techniques. Using the pixel velocity values, a velocity map may then be produced. On the assumption that the obtained velocity values for this pixelated model are accurate, the geologist or geophysicist is presented with a powerful tool.

For reasons which will become evident, however, it is submitted that the pixelated model has not met the goal of providing high resolution accurate imaging. It is noted that, even though the aforedescribed procedure used in developing a pixel type velocity map, represents a somewhat simplified version of the actual procedure which is used in producing an initial velocity map, this description serves to clearly illustrate the reason for its particular weakness. More specifically, each pixel within region 14 represents an unknown velocity value. As described above, a typical seismic data record may contain, for example, approximately forty thousand direct arrival traveltimes. Unfortunately, a particular pixelated model may contain such a large number of pixels that the known direct arrival traveltimes are far outnumbered. Such a model results in an under determined system of equations for which more than one correct velocity solution exists yielding a relatively low resolution (inaccurate) image as compared, for example, with typical well log records.

Various techniques have been applied in an attempt to deal with this ambiguity of solutions and thereby improve resolution. For example, limitations have been placed on velocity values assigned to adjacent pixels. As another example, larger pixels have been used. These techniques, thus far, have yielded insufficient resolution improvements, producing tomograms which are considered to be of limited value by those of skill in the art. In fact, it is now believed by many of skill in the art that high resolution seismic tomography is an impractical expectation.

As a consequence, still further techniques have been developed in attempting to cope directly with the low resolution problem. For instance, the distribution of pixels has been changed such that areas of particular interest within a region are covered by a greater number of pixels than those areas which are not considered to be of interest. However, the goal of high resolution seismic tomography remains unattained using this technique, and other similar techniques, for reasons which are recognized by the present invention and which will be described hereinafter.

It is noted that models other than the pixelated type have been developed for use in describing subsurface structure. One such model was described by Harris (1994) in his paper entitled, "An approach to adaptive gridding for traveltime tomography" and employs a distribution of nodes throughout the region of interest. The subject paper introduces the concept of nodes, but offers no guidelines or "rules" as to how to place the nodes in order to extract optimum resolution.

The present invention solves the high resolution seismic tomography problem by using a highly advantageous model and associated method which have not been seen heretofore and which have been developed in recognition of the unique nature of seismic data records. Additionally, the present invention provides a heretofore unseen, simple and highly effective technique which compensates for borehole deviation.

SUMMARY OF THE INVENTION

As will be described in more detail hereinafter, a method for establishing a map of the value of a particular characteristic, for example seismic velocity, of a subsurface region of ground between two generally vertically extending boreholes is disclosed herein. This method, like the method of the prior art, uses certain seismic data which relates to the characteristic of interest and which is obtained using the boreholes. However, in accordance with one feature of the present invention, a set of vertically spaced, generally horizontally extending continuous layers is defined within the region between the boreholes. A certain number of node points are then chosen within the region which are fixed in position horizontally and which, at least in the first instance, are located within the boundaries of each layer such that the nodes remain in the layer in which they are initially located. The specific number of chosen node points is selected so that the value of the particular characteristic of the subterranean region at each of the nodes is one which can be determined from the seismic data. Having established the node points, the value of the particular characteristic is determined at each node point using the seismic data. Thereafter, values of the particular characteristic, which as stated is for example seismic velocity, are assigned to positions between the node points of each layer based on the values at the chosen node points within the layer and, in accordance with another feature of the present invention, without regard to the values at node points within any other layer. A map, which may serve as an approximate model of the region, may then be produced using the node point values and the assigned values therebetween.

In accordance with still another feature of the present invention, an approximate model of the region is established using a first type of the seismic data. This approximate model is then adjusted by using a second type of the seismic data in combination with the approximate model itself so as to establish a more definitive model of the region. More specifically, the approximate model may be established using direct arrival traveltime data as the first type of data while the second type of data may comprise the full waveform reflection events (i.e. reflection data). By iterating this approach, a most definitive model may be sought.

In accordance with yet another feature of the present invention, the boreholes within the region of interest may be skewed with respect to one another and with respect to the vertical. Compensation for measured traveltimes or for traveltimes calculated by ray tracing, in this skewed orientation, may be provided by measuring the three dimensional orientation and position of each borehole within the ground and using the orientation measurement obtained in combination with the respective measured or ray tracing predicted traveltimes. An approximate length associated with each traveltime is established by assuming that the boreholes are vertically oriented in the ground and in knowing the depths from which the seismic energy is transmitted from one borehole and thereafter measured at the other borehole. Next, the actual, three-dimensional length associated with each approximate length may be established based on the measured orientation of the boreholes. A compensated value for a particular traveltime is determined by multiplying the particular traveltime by the ratio of its associated actual length to its associated approximate length. The compensated traveltime may then be used in establishing a map of a particular characteristic over the region of interest.

BRIEF DESCRIPTION OF THE DRAWINGS

The present invention may be understood by reference to the following detailed description taken in conjunction with the drawings briefly described below.

DETAILED DESCRIPTION OF THE INVENTION

Attention is immediately directed to FIG. 2 which again illustrates system 10 within region 14. Having previously described system 10, like reference numbers will be applied to like components whenever possible and the reader is referred to preceding descriptions of these components for purposes of brevity. Moreover, system 10 produces seismic data in the manner described above for use herein. In this regard, it is to be understood that while the method of the present invention is described as using seismic data which is produced in one particular way (i.e., by system 10), the present invention contemplates the use of seismic data which may be produced by other systems and in accordance with other methods either known or to be developed. Having been obtained in a suitable manner, seismic data is processed in accordance with the method of the present invention, as will be described immediately hereinafter.

Figure 2:
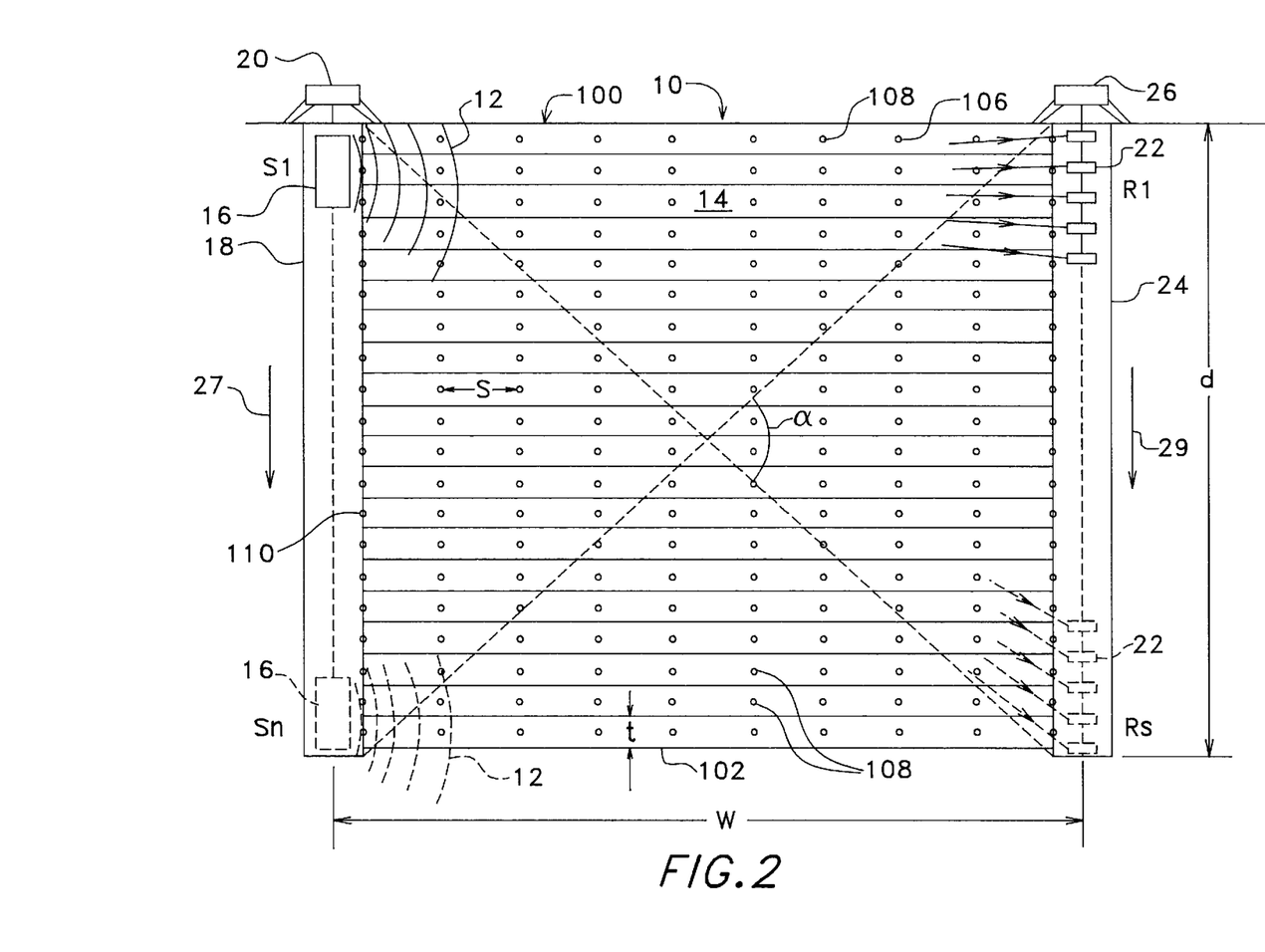
FIG. 2 is a cross-sectional view in elevation of the subterranean region of FIG. 1 further illustrating a node/layer model which is established in the region in accordance with the present invention.

Still referring to FIG. 2, it will initially be assumed, for illustrative purposes, that the specific geologic structure within region 14 is unknown. In accordance with the present invention, a node/layer model is formed in region 14 and is generally indicated by the reference number 100. Node/layer model 100 is made up of a set of vertically spaced, generally horizontally extending layers 102 which extend between boreholes 13 and 24. Layers 102 are continuous and include a thickness t which is determined based on various factors which will be described at appropriate points below. In the horizontal direction, each layer is considered as being heterogeneous whereby to accommodate a varying geologic characteristic of interest such as, for example, seismic wave propagation velocity at all positions along the horizontal extent of the layer. With regard to layer thickness t, each layer 102 is considered as homogeneous in the vertical direction. That is, along a vertical line drawn at any position within any specified layer, the value of the characteristic of interest is assumed to be constant. In conjunction with layers 102, an arrangement of nodes 106 is defined within region 14 such that each layer 102 includes a group 108 of nodes. The latter are fixed in position horizontally and may be permitted to move vertically between the upper and lower boundaries of the layer in which they are positioned. Within each layer, the outermost nodes 110 of its particular group are positioned at the edge of the boreholes, but are considered as being within their associated layers while the remaining nodes for that group are evenly distributed across the distance between the two boreholes. The number of nodes per layer is chosen in a predetermined way based, at least in part, on the seismic data. More specifically, selecting the overall number of nodes 106, the number of nodes within each group 108 and the layer thickness t depends at least in part on certain characteristics of the seismic data record which is established by the arrangement and overall operation of system 10 within region 14. That is, by changing any one of a number different parameters such as, for example, transmitting locations $S_1$–$S_N$ or receiving locations $R_1$–$R_S$, these certain characteristics of the seismic data are altered. As will be seen hereinafter, the node/layer approach of the present invention recognizes the importance of these characteristics and, in view thereof, utilizes the seismic data in a highly advantageous way which has not been seen heretofore. A number of these characteristics and their relationship to relevant aspects of seismic imaging will be considered immediately below.

As previously described, one characteristic which influences the seismic data is the aperture angle α at which the data is taken. The angle α itself is influenced by the separation, w, between the boreholes 18 and 20 and the depth, d, of boreholes 18 and 24 (or the thickness of a zone defined between the boreholes at a range of depth below the surface, as discussed above). It is noted that boreholes 18 and 24 are illustrated as having the same depth, however, they may and, in fact, many times do include different depths such that the aperture angle may be changed and, hence, the resultant seismic data is influenced by these different depths. As also mentioned previously, α defines the steepest or most vertically approaching raypaths within region 14 based on certain combinations of source/receiver array positions in system 10. Because features within a region of interest are most readily distinguished or resolved in a direction which is generally perpendicular to a wavefront (seismic energy 12, in this case), the resolution capabilities of a particular seismic data record are inherently linked with α, as will be further described.

Another characteristic of the seismic data which is of concern is related to the distribution or density of raypaths within region 14. Raypath density can be influenced, for example, by α and by the distribution between an overall number of source/receiver positions. In the case of typical seismic data records which are produced in the aforedescribed manner, raypath distribution is relatively uniform throughout the subterranean region of interest. The present invention recognizes that the raypath density at or near a particular position within a region of interest, in conjunction with the model being used, determines the degree of accuracy with which seismic velocity, for example, may be determined for that particular position. As an example, the variable pixel distribution model, described above, attempted to solve the problem of low resolution by simply placing a greater number of pixels in an area of interest whereby to improve the resolution in that area. However, in accordance with the teachings of the present invention, one of skill in the art will appreciate that, while variable pixel distribution at first may appear as a viable solution, a higher resolution can be achieved in a higher pixel density area only if the raypath density in that area is correspondingly increased. Without such an increase in raypath density, resolution in the high pixel density area remains relatively low, irrespective of any number of additional pixels located within the area. Moreover, the variable pixel distribution approach may be impractical in many cases simply because prior knowledge of a region's structure is required in order to set up system 10 so as to redistribute the raypath density to the area of interest. Of course, this is not possible in an unknown region.

Still another relevant characteristic of the seismic data record resides in the number of useful direct arrival traveltimes which are contained by the record. As mentioned previously, a typical seismic data record may define forty thousand direct arrival traveltimes. Any model, in order to provide the highest level of accuracy in resolution, should utilize the direct arrival traveltimes in the most meaningful way. In this regard, prior art pixelated models, in general, defined such a large number of unknowns in relation to the known number of direct arrival traveltimes that only low resolution tomograms were possible.

Having established a number of significant characteristics of the seismic data record which are recognized herein and reminding the reader that the present example considers an unknown region, further description of the node/layer model of the present invention, as shown in FIG. 2, will now be provided with regard to its relationship to these various characteristics and with regard to associated considerations. Unlike the prior art pixelated model, the node/layer model of the present invention is formulated such that a determinative seismic velocity value may be calculated at each node, seismic velocity being the particular characteristic of interest. Described in slightly different terms, the number of nodal velocity values (as unknowns) is limited such that the solution for the velocity value at each of these nodes is unique, that is, determinate. Therefore, the total number of nodes 106 must be equal to or less than the number of measured direct arrival traveltimes which are separable from the seismic data record. The seismic velocity value at each node may be determined using the direct arrival traveltimes by setting up and solving a system of equations (one for each node) in a manner which is similar to solving the previously described system of equations for a pixelated model except, of course, the solution is determinate. For uniform raypath densities, an equal number of nodes may be assigned to node group 108 of each layer with an even distribution across each layer. For uneven raypath densities, the number and spacing of nodes from layer to layer can be adjusted accordingly. Once the initial nodal velocity values are known, a seismic map could be produced, as will be further appreciated with the continuing description of the method of the present invention. In most cases, however, the initial node values are adjusted in an iterative manner using techniques such as, for example, ray tracing so as to determine final velocity values which are assigned to the nodes. Further discussion of an advantageous ray tracing technique used with node/layer model 100 will be provided at an appropriate point below.

Continuing to refer to FIG. 2 and having established unique values at nodes 106, specific advantages of node/layer model 100 of the present invention will become evident with the establishment of velocity values for positions between the nodes of layers 102 in region 14. The approach taken by model 100 defines different vertical and horizontal resolutions for reasons which will become apparent. More specifically, vertical resolution within model 100 is referred to as a vertical mapping resolution and is defined by the thickness t of layers 102 wherein each layer is considered as being homogeneous in the vertical direction. Horizontal resolution within model 100 is referred to as a horizontal mapping resolution and is defined using a respective node group 108 within the boundaries of each layer. In accordance with the present invention, seismic velocity values for positions which lie between horizontally adjacent nodes within an individual layer are determined by linear interpolation between the calculated velocity values at adjacent nodes such that a smooth horizontal seismic velocity variation is defined within a particular layer across its entire thickness. It should be emphasized at this juncture that the horizontally varying properties of a respective layer are, in this manner, determined based solely on the nodes within the boundaries of that layer. That is, node values within bordering layers are not considered. For this reason, it should be apparent to one skilled in the art that a seismic velocity map can be produced by knowing only the node values and the arrangement of node/layer model 100.

With an understanding of the characteristics of the seismic data record and of node/layer model 100, it should be appreciated that model 100 conforms with typical seismic data records in a highly advantageous way which can most readily be understood based upon aperture angle $\alpha$. As described previously, $\alpha$ inherently defines the resolution capabilities of a particular seismic data record for relatively uniform raypath distributions. This model/data relationship is best understood within the context of a "standard seismic data record" which is identified by the present invention as one recorded using an aperture angle $\alpha$ in the approximate range of 40° to 60° and having a relatively uniform raypath distribution. So long as $\alpha$ resides within or approximately within the range just recited, and for reasons which will become apparent, the results produced by node/layer model 100 are optimized in the case of a standard seismic data record when two simple, but heretofore unknown rules are conformed to in establishing the model, as follows: (1) node to node spacing S (which is, for example, one-ninth of the inter-well distance or 90 feet for a typical inter-well distance of 900 feet) is substantially greater than layer thickness t (which is, for example, two feet) and (2) no more than ten nodes are assigned to node group 108 of each layer. With regard to rule 1, it will be remembered that node to node spacing S defines the horizontal mapping resolution of model 100 while layer thickness t defines the vertical mapping resolution. Thus, assuming node/layer model 100 is properly laid out in the region of interest, rule 1 defines a higher vertical than horizontal mapping resolution which automatically correlates with typical raypath densities and directions of standard seismic data records such that the model's mapping resolutions advantageously match the inherent resolution capabilities of the data in both the vertical and horizontal directions. It is submitted that this advantage has not been seen heretofore.

With regard to rule 2, it will be remembered that horizontal mapping resolution is inherently limited by $\alpha$ in view of the limited vertical component of orientation of raypaths within region 14. In accordance with the present invention, it is considered to be of little value in asking more of the seismic data record in terms of horizontal mapping resolution than it is, in fact, capable of delivering. Therefore, rule 2 provides a mechanism which automatically scales the horizontal mapping resolution of the model to the inherent capability of the seismic data for a standard seismic data record. Remarkably, it has been discovered that standard seismic data records, based on their inherent characteristics, can provide images which approach the highest practical vertical and horizontal resolution limits when these rules are applied. In a mathematical sense, rules 1 and 2 represent an optimum distribution of known values (i.e., direct arrival traveltimes) by the model over the region of interest. In a basic sense, these rules cooperate in a way which serves to correlate the horizontal and vertical mapping resolutions of the model not only to each other, but to these inherent characteristics of the standard seismic data record itself based very simply on its aperture angle. As will be seen immediately hereinafter, node/layer model also conforms to geologic features in a highly advantageous way which has not been seen heretofore.

As regards the aforementioned vertical and horizontal mapping resolutions of node/layer model 100, it is with specific intent that the layered, nodal structure of model 100 has been developed so as to be similar to actual geologic structures which are found in a majority of areas. In particular, many subterranean regions include generally horizontally extending strata. The latter are generally distinguishable by variations in a particular seismic property such as, for example, seismic wave propagation velocity. Additionally, each stratum is typically homogeneous at least with respect to velocity across its vertical extents, but may be very different in velocity characteristics when compared with an adjacent stratum such that abrupt velocity changes may be encountered from one stratum to the next. While it has been found that each stratum may include either a homogeneous or a heterogeneous horizontal seismic velocity characteristic, it is significant that the rate of heterogeneous horizontal variation is much more limited within individual strata as compared to vertical variation across stratification boundaries. Indeed, the variation horizontally along an individual stratum is generally quite smooth. In view of the preceding description of the node/layer model of the present invention, it should be appreciated that layers 102 of the model are characterized in a manner which directly conforms to the characteristics of typical strata. That is, a smooth horizontal seismic velocity variation is determined over a particular layer only by nodes within its boundaries and irrespective of nodes within any other layer such that this smooth velocity variation advantageously simulates the horizontal seismic characteristics of typical strata. At the same time, abrupt velocity changes may occur from one layer to the next much like actual strata, although again it should be noted that vertical seismic characteristics within a layer are constant along a particular vertical line.

In view of the foregoing discussion, it should be evident that the structure of node/layer model 100 is founded, on the one hand, upon the characteristics of geological structure and founded, on the other hand, on the inherent characteristics of seismic data records. Therefore, model 100 provides a heretofore unavailable and highly advantageous link between the expected geologic features and the seismic data which optimizes the application of seismic imaging. For example, the usefulness of velocity maps produced by the method of the present invention is evidenced by resolutions which readily correlate with typical well logs.

The method of the present invention is readily applied to seismic data records having aperture angles outside the range of standard seismic data records, as well, by simple adaptations of node spacing S, the number of nodes per layer and layer thickness t. Aside from these adaptations, the use of node/layer model 100 is unchanged and all of its advantages, as described heretofore, are applicable. Specific adaptations for both small and large aperture angles will be described immediately hereinafter.

For purposes of clarity, the following discussions relating to small and large aperture angles are based on the arrangement of FIG. 2 with changes (not shown) in aperture angle $\alpha$ assumed to be the result of changes in the depths of boreholes 18 and 24 while the separation w between the boreholes remains constant. It is further assumed that system 10 is operated in the manner described above. That is, the number of source transmission positions $S_n$ and the number of receiver array positions $R_S$ are unchanged such that the seismic data record yields essentially the same number of direct arrival traveltimes. Removal of these constraining assumptions will be considered below and it is to be understood that they are presently imposed solely for purposes of enhancing the reader's understanding in terms of relative aperture angle changes.

For small aperture angles, less than approximately 40°, it should be appreciated that the available horizontal resolution is reduced because seismic energy passes more horizontally through region 14, that is, its horizontal component increases. Additionally, raypath density is concentrated along the vertical extents of the region by distributing the source/receiver positions over less available depth. Therefore and in order to conform to the seismic data record's inherent characteristics, node to node spacing S may be correspondingly increased, whereby to reduce the number of nodes per layer to less than 10, while layer thickness t may be decreased such that vertical resolution is increased by shifting resolution from the horizontal direction to the vertical direction. In this manner, model 100 conforms with the low aperture seismic data record so as to enable the production of an optimum image.

For large aperture angles, greater than approximately 60°, it should be appreciated that the available horizontal resolution is increased because seismic energy passes more vertically through region 14, that is, its vertical component increases. Additionally, raypath density or concentration is decreased along the vertical extents of the region by a spreading of source/receiver positions over a greater available depth. Therefore and in order to conform to the seismic data record's inherent characteristics, node to node spacing S may be correspondingly reduced, whereby to increase the number of nodes per layer to more than 10, while layer thickness t may be increased such that resolution is shifted from the vertical direction to the horizontal direction, as compared with a standard seismic data record. It should be noted that, for large or small aperture angles, that is, angles above and below the approximate range recited, model 100 is formulated as described above with the exception that rules 1 and 2 are not imposed.

Having provided details regarding the effects of relative changes in aperture angle $\alpha$ with constant spacing between boreholes, it is considered that one of skill in the art may readily adapt the node/layer model of the present invention based on different crosswell measurement configurations and specific seismic data records obtained therefrom For example, a seismic data record may provide an exceptionally large number of direct arrival traveltimes in which case horizontal and/or vertical resolution may be appropriately increased. Other factors may also be relevant in specific cases. For example, in a case where the boreholes are separated by a relatively long distance, resolution may be affected by high frequency attenuation of the seismic signals. Other aspects, advantages and results achieved using node/layer model 100 will be described at an appropriate points hereinafter in relation to the method of the present invention.

It should also be mentioned that node/model 100 may be adapted in other ways for specific applications or seismic data records. For example, the model may include different numbers of nodes within different layers or layers having different thicknesses. Such adaptations may be useful in conforming the model to a seismic data record which is deliberately produced having higher raypath densities in areas of interest within an overall region such that higher image resolution is provided in the areas of interest. One of skill in the art will recognize that the node/layer model of the present invention is adaptable with an ease in such cases which has not been seen heretofore while still retaining its attendant advantages.

Figure 3:
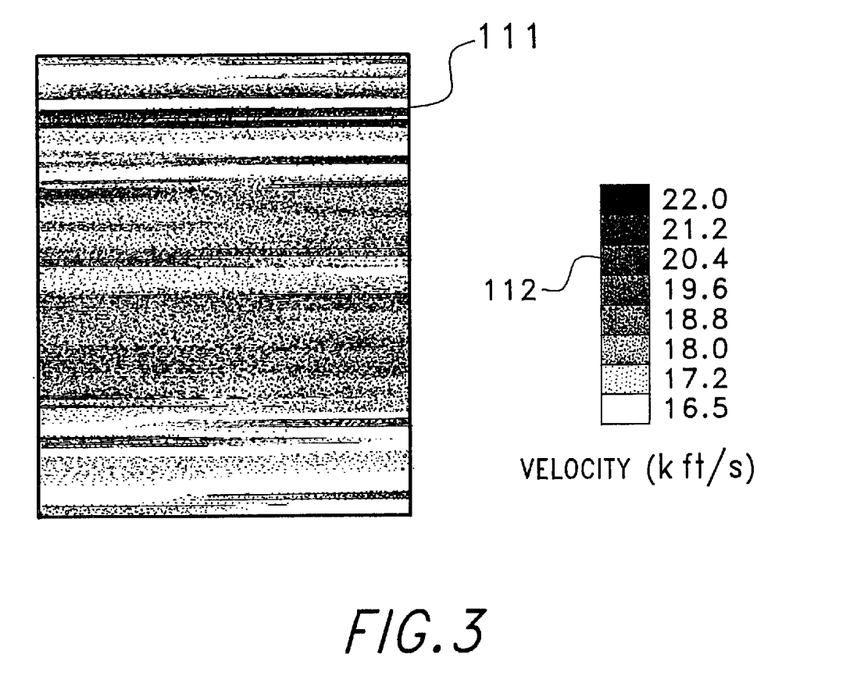
FIG. 3 is a monochrome representation of an actual color seismic image which was produced in accordance with the present invention.

Turning now to FIG. 3 and having generally described the node/layer model and associated method of the present invention, an exemplary seismic velocity map 111 is presented in order to illustrate results obtained through the use of the present invention. It is noted that map 111 is a monochromatic representation obtained from an actual color map which was produced in accordance with the present invention using a seismic crosswell data record characterizing a region between two west Texas wells. A velocity chart 112 is provided which correlates exemplary seismic wave propagation velocity values (in kilofeet per second) with gray shades that are present in map 111. The imaged region consisted of generally flat lying beds in the West Texas San Andres and Grayburg formations (Permian Basin). The aperture angle of the data was 50° and the distance between boreholes was 186 feet. The layers were all considered flat with a thickness of two feet and eight nodes per layer such that node spacing was approximately twenty-seven feet. Well logs were not used to set up the initial model. Instead, a constant velocity initial model was used. Results agreed very well with sonic logs and had a resolution equivalent to that of the sonic logs.

It is noted that the map represented in FIG. 3 was produced in accordance with node/layer model 100 as it is used in the method of the present invention. As will be seen, other steps of the method utilize portions of the available seismic data other than direct arrival traveltimes.

Figure 4:
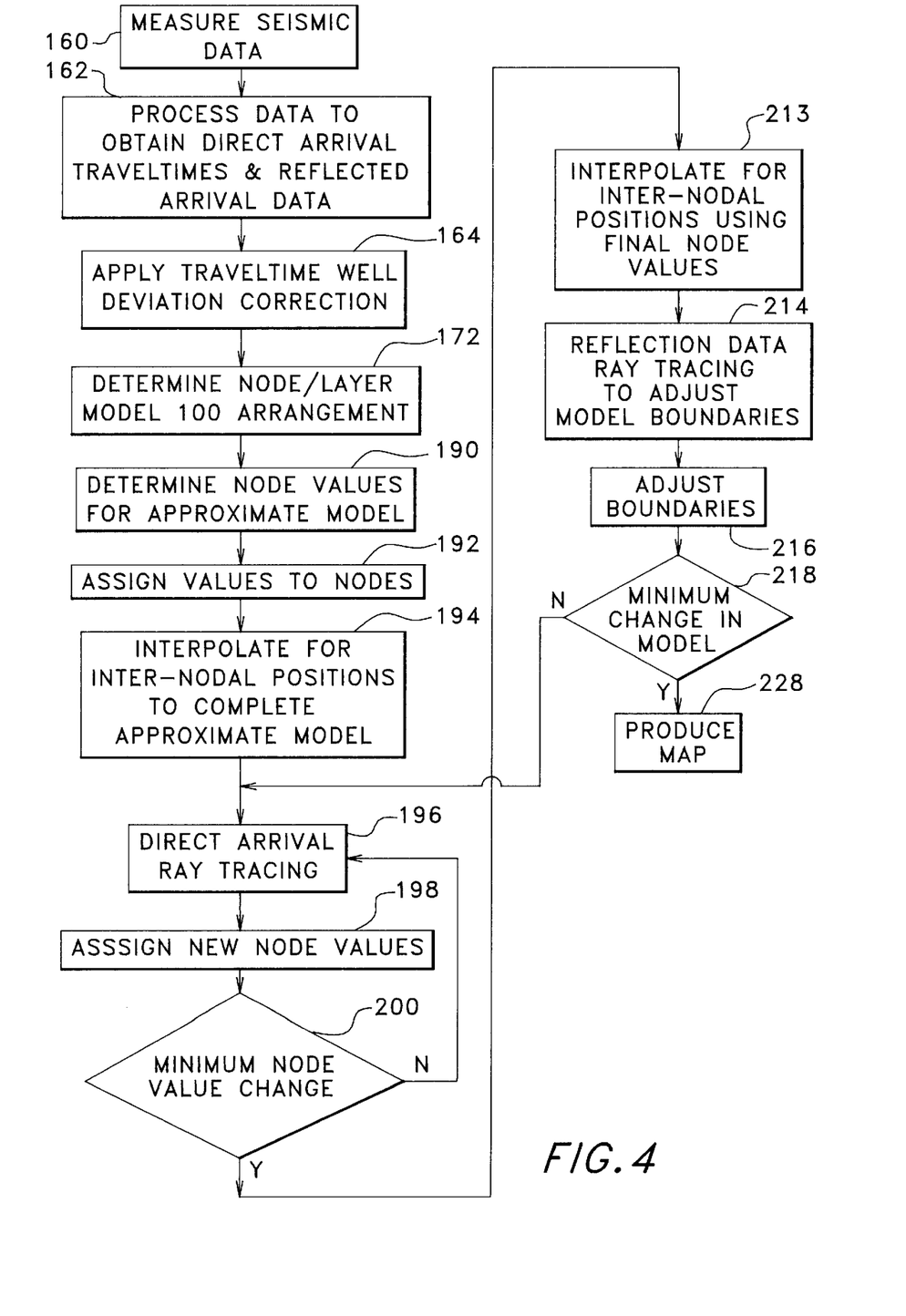
FIG. 4 is a flow diagram which illustrates an overall method of the present invention.
Figure 5:
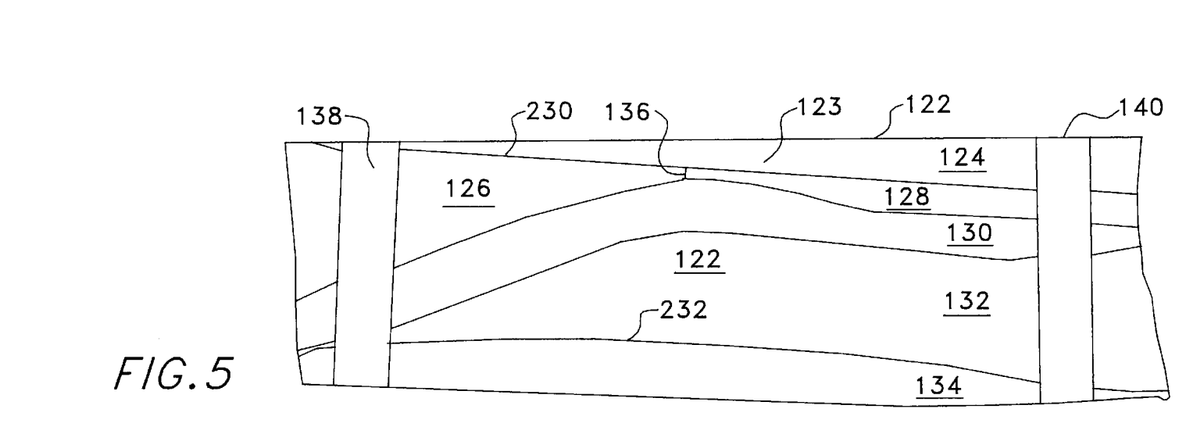
FIG. 5 is a cross-sectional view, in elevation, of a region extending ween two boreholes, shown here to illustrate exemplary strata within the region and purposes of illustrating well deviation.

Referring now to FIGS. 4 and 5, a discussion focusing on the method of the present invention is now facilitated having described node/layer model 100. Because the application of the model in an unknown region has been described above, its application to a known region will be considered in conjunction with the method of the invention which is illustrated in the flow diagram of FIG. 4. A known region 122 (based on, for example, well logs) is shown in FIG. 5. Region 122 includes a series of generally horizontally extending strata 123 which are individually indicated by the reference numbers 124, 126, 128, 130, 132 and 134. For exemplary purposes stratum 126 abuts stratum 128 forming a truncation 136. Strata 123 extend between a pair of boreholes 138 and 140. It is evident that borehole 138 deviates from a perpendicular direction in a manner which is not uncommon. However, it is to be understood that the deviation of borehole 138 is shown as being in the plane of the figure for purposes of illustration and that the present invention contemplates and is applicable to borehole deviation in any three dimensional crosswell situation for one or both of the boreholes.

Continuing to refer to FIGS. 4 and 5, step 160 is performed initially in which seismic data is recorded in a way which characterizes region 122. Having described the development of this data above and its characteristics, this description will not be repeated for purposes of brevity and the reader is referred to previous discussions relating to FIGS. 1–3. In step 162, the seismic data is processed in accordance with known techniques so as to separate direct arrival traveltime data and reflected arrival data therefrom. At step 164, correction is applied to the traveltime data so as to compensate for well deviation in a highly advantageous way. It will be appreciated by one of skill in the art that techniques exist for accurately determining and physically measuring well deviation in crosswell imaging situations in view of the fact that imaging results can be significantly affected. For example, various instruments such as gyroscopes have been used to measure such deviation. Therefore, information as to the deviation in a particular situation is normally available. In the past, relatively complex schemes have been developed in attempting to deal with well deviation using the available information. In accordance with the present invention, well deviation is corrected in a simple yet, highly advantageous and heretofore unseen way, as will be seen immediately hereinafter.

Figure 6:
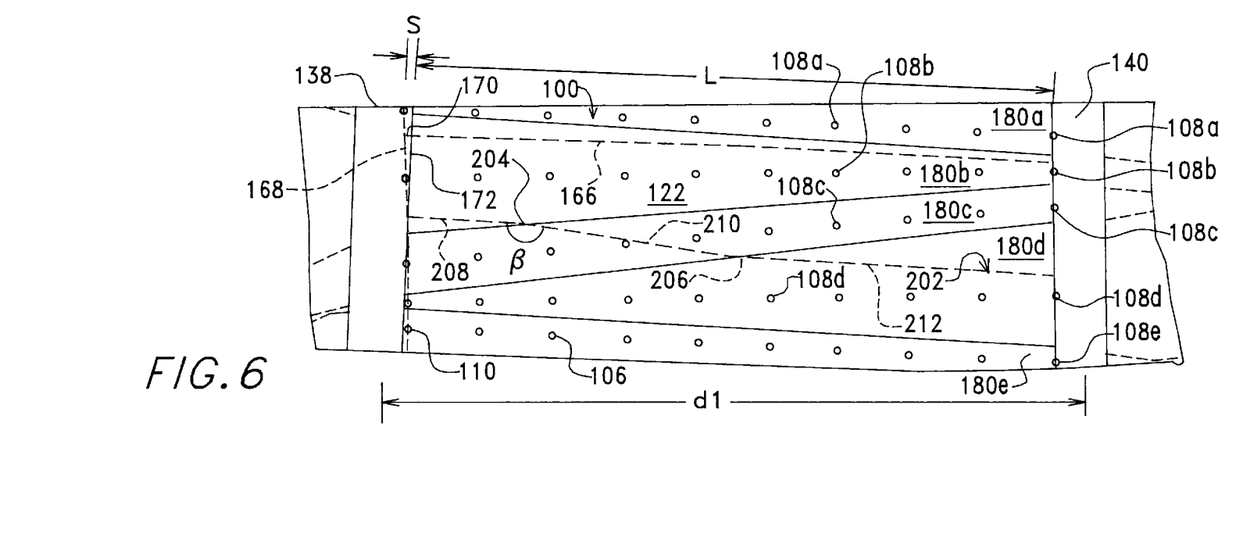
FIG. 6 is a cross-sectional view, in elevation, of the region of FIG. 5 own here to illustrate the configuration of the node/layer model of the present invention based on well logs and further illustrating correction of well deviation with regard to an exemplary raypath.

Referring to FIG. 6, boreholes 138 and 140 are shown in region 122, but without intervening strata for illustrative purposes. A direct arrival traveltime raypath 166 having an actual length L is shown extending between the boreholes. Traveltimes are also associated with raypats which are obtained by ray tracing, which will be described. With regard to raypath 166, the reader is reminded that the endpoints of all raypaths, as to depth, are known to a rather precise degree based on source and receiver positions (not shown). In accordance with the present invention, it is initially assumed that boreholes 138 and 140 are perpendicular and are separated by an average distance d1. A perpendicular assumed edge 168 of borehole 138 is shown such that raypath 166 extends thereto. It is evident that the actual length L of raypath 166 is lengthened by a segment 170 having a length S and extending between assumed edge 168 and an actual edge 172 of the borehole. Initially, however, an approximate length $L_A$ of raypath 166 is determined as L+S using d1, the assumed perpendicular edge 168 of borehole 138 and the known depths of the endpoints of the raypath. Correction is applied using the simple equation:

$$t_c = \left(\frac{L}{L_A}\right) t \quad (2)$$

wherein t is the traveltime which is associated with raypath 166, $t_c$ is compensated traveltime and L is the true length of raypath 166 (as determined in three dimensions). In effect, the traveltime is corrected by being multiplied by the ratio of its true length to its assumed length. The resulting corrected traveltimes, $t_c$, are then used in step 172 in conjunction with node/layer model 100. Moreover, it is to be understood that this correction technique is applicable and highly effective in subsequent ray tracing steps of the method of the present invention for use in correcting traveltimes which are established by ray tracing. It should be appreciated, however, that having performed this correction on measured traveltimes, correction is not required in subsequent ray tracing steps. Alternatively, step 164 need not be performed if correction, as described, is incorporated into subsequent ray tracing steps. Moreover, while this correction technique is illustrated using a straight raypath for illustrative purposes, it should be appreciated that its use is not limited thereto, but extends to correction of reflected arrival traveltimes and other wave propagation modes which may be of interest. This technique has proven to yield exact results for constant velocity media and has been found to be effective even in cases of complex strata.

Referring to FIGS. 4 and 6, node/layer model 100 is applied in step 172 to region 122. Inasmuch as node/layer model 100 has been described in detail above, the present discussion will primarily be limited to describing aspects of the model which ere influenced by knowledge of the geologic region in which it is being applied. As noted, it is assumed that region 122 is not unknown in structure due to the availability of well logs for boreholes 138 and 140 which indicate velocity values and changes along the depth of each borehole. Based on these well logs and assuming their accuracy, the depth of boundaries between strata 124, 126, 128, 130, 132 and 134 are known at the boreholes. In such a case, node/layer model 100 is advantageously formulated in the first instance with a series of layers 180 having different reference numbers than layers 102 of FIG. 2 for purposes of clarity, but having the same properties with the exception of uniform thickness. Layers 180 are individually designated as 180a–e and include boundaries that correspond to the boundaries described by the well logs. Since the boundary locations between the boreholes are unknown, the simplest possible assumption is made with regard to the inter-well boundaries. More specifically, the latter are assumed to be straight. It should be noted that model 100 includes one less layer than the number of strata in region 122 due to truncation 136. However, the seismic map produced by method 120 may be expected to reveal this feature in a way which will be described at an appropriate point below.

Continuing with a discussion of the use of node/layer model 100, nodes 106 and node groups 108, which are indicated as 108a–e, for each layer are laid out in a manner which is consistent with that described previously. Note that outermost nodes 110 of borehole 138 are positioned on its assumed vertical edge 168. It will be recalled that each layer is vertically homogeneous and that, therefore, each node defines the seismic velocity along a vertically extending line for the entire thickness of its layer. For illustrative purposes, nodes 106 are shown positioned vertically centered within their respective layers. However, it should be understood that vertical movement of the nodes, because they remain within the same layer, do not by themselves affect the results obtained from model 100.

Once node/layer model 100 has been set up for region 122, step 190 is performed in which a determinative value of seismic velocity is calculated for each node position by solving an appropriate system of equations, as described previously. At step 192, the calculated values are assigned to the nodes. With step 194, the development of an initial approximate model may be completed by interpolating between horizontally adjacent nodes of each layer to obtain a smooth velocity variation across the width of the layers. This approximate model may be plotted, if so desired, as a seismic velocity map.

Having established an approximate model using the approach of node/layer model 100 and still referring to FIGS. 4 and 6, the method of the present invention moves to step 196. Steps 196, 198 and 200 form an iterative ray tracing loop. Generally, the establishment of the approximate model is referred to as an inverse modeling technique.

Ray tracing, in comparison, is referred to as a forward modeling technique. While a number of different ray tracing techniques have been developed in the prior art, the present invention employs a highly advantageous ray tracing approach which uses node/layer model 100. In this approach, a dense fan of rays (not shown) is mathematically shot out from each source position. Using the known direct arrival raypaths, new rays are found (out of the overall fan of rays) which link the source and receiver positions in accordance with a predetermined level of accuracy. As noted previously, traveltime correction for well deviation may be applied to these new raypaths in the manner described with regard to step 164. Ray tracing is performed in accordance with the present invention by using several advantageous approximations which will be described immediately hereinafter.

As a first approximation, the raypaths are assumed to be straight inside the layers. Each raypath is approximated as a set of linear segments extending between layer boundaries. For example, in the case of an exemplary raypath 202 which passes through layers 180b, c and d (shown in FIG. 6), intersections 204 and 206 are established at the boundary between layers 180b and 180c and the boundary between layers 180c and 180d, respectively, such that the raypath includes three segments 208, 210 and 212. This approximation works very well in practice since very thin layers are used in typical models resulting in a piecewise linear approximation, based on the raypath segments, which very accurately simulates the actual raypaths. In this regard, it is to be understood that the thickness of strata in region 122 has been exaggerated as compared with the distance of separation dl between boreholes 138 and 140 for purposes of illustration. The traveltime over raypath 202 (and any other raypath) is calculated by integrating values along each segment as established by the node values and interpolated values therebetween.

As a second approximation, ray bending at layer boundaries is determined using a node value averaging technique which applies Snell's law at boundaries intersecting raypaths, e.g., intersections 204 and 206. More specifically, the seismic velocities within layers at either side of a particular boundary are separately determined as an average of all of the nodal velocity values for nodes within each bordering layer. For example, in the case of intersection 204 on raypath 202, the velocity $v_{180b}$ at the boundary of layer 180b, for refractive purposes, is calculated as the average of the values which are assigned to the nodes of node group 108b while the velocity $v_{180c}$ at the boundary of layer 180c, for refractive purposes, is calculated as the average of the values which are assigned to the nodes of node group 108c. Thus, $v_{180b}$ and $v_{180c}$ are used in the application of Snell's law to intersection 204 so as to determine an angle β at which raypath 202 is bent. This node value averaging technique is highly effective in insuring that ray tracing links essentially all rays even in complex strata.

In combination, the two approximations above greatly improve the linking properties in ray tracing and reduce sensitivity of the raypaths to spurious noise, which may be present in the model. A majority of source/receiver positions are very accurately linked even in models with large velocity variations and even in the case of complex strata. It has also been found that this ray tracing technique is advantageous in that it always traces true direct arrival waves as opposed to, for example, head waves, post-critical reflections and other turning-ray modes which are commonly produced by ray tracing of pixelated models. This effectiveness is achieved even for raypaths that are sub-parallel to the model layering which is a well known difficulty in a number of prior art ray tracing implementations.

It is to be understood that ray tracing represents only one forward modeling technique which may be used in implementing the method of the present invention and that any suitable forward modeling technique either presently available or to be developed may be used.

Having completed a first ray tracing step, step 198 is performed in which new values are assigned to nodes 106 based upon just completed ray tracing step 196. At step 200, the change in node values is determined. If the determined change is greater than a certain percentage, ray tracing step 196 and node assignment step 198 are repeated. If, on the other hand, the determined change is less than this certain percentage, iteration concludes, the last assigned node values are considered as final values and step 213 is performed in which values are linearly interpolated between nodes, as described previously. At this point, boundaries between layers 180 remain straight. As will be seen immediately hereinafter, the method of the present invention provides a highly advantageous way of adjusting the boundaries of the layers which make up model 100 so as to more accurately reflect the actual strata boundaries (see FIG. 5).

Referring to FIGS. 4–7, the approximate model is used in combination with reflection data, which was obtained in step 162, in an iterative series of steps beginning with step 214 which adjust the boundaries of layers 180 in node/layer model 100. More specifically, in step 214, ray tracing is performed based on the approximate model with the final node values which were established in steps 196, 198 and 200. It is mentioned that step 214 provides information regarding the orientation and location of boundaries which serve as reflective structures, however, the final node values themselves are not affected. Reflected type rays are traced using the approximations described above with regard to step 196. The reflected traveltimes are defined between known source and receiver positions with intermediate reflections caused by strata boundaries in region 122. By using the reflected arrival data and the reflected raypaths with associated traveltimes which are calculated by ray tracing, the boundaries of strata 123 can be approximately defined in accordance with known reflection mapping techniques such as, for example, VSP-CPD (Vertical Seismic Profiling to Common Depth Point. Having identified the approximate locations of strata boundaries, the associated boundaries between layers 180 of node/layer model 100 are adjusted accordingly in step 216.

In accordance with the present invention and at step 218, the adjusted layer boundaries are compared with their previous locations and the amount of change in their locations is established. If the change is more than a predetermined amount, step 196 and subsequent steps thereto are repeated using the last node values (from the last iterative performance of the inner loop of steps 196, 198 and 200) with the adjusted layer boundaries (from last pass through step 216) such that the node values are more precisely adjusted and the locations of reflective structures are still more precisely defined. As this iterative process continues, the amount of change in layer boundary positions progressively reduces as the layer boundaries converge on the actual strata boundaries. Once the test of step 218 has been passed, i.e. the layer boundary location change is less than the predetermined amount, step 228 may be performed, as will be described below.

Figure 7:
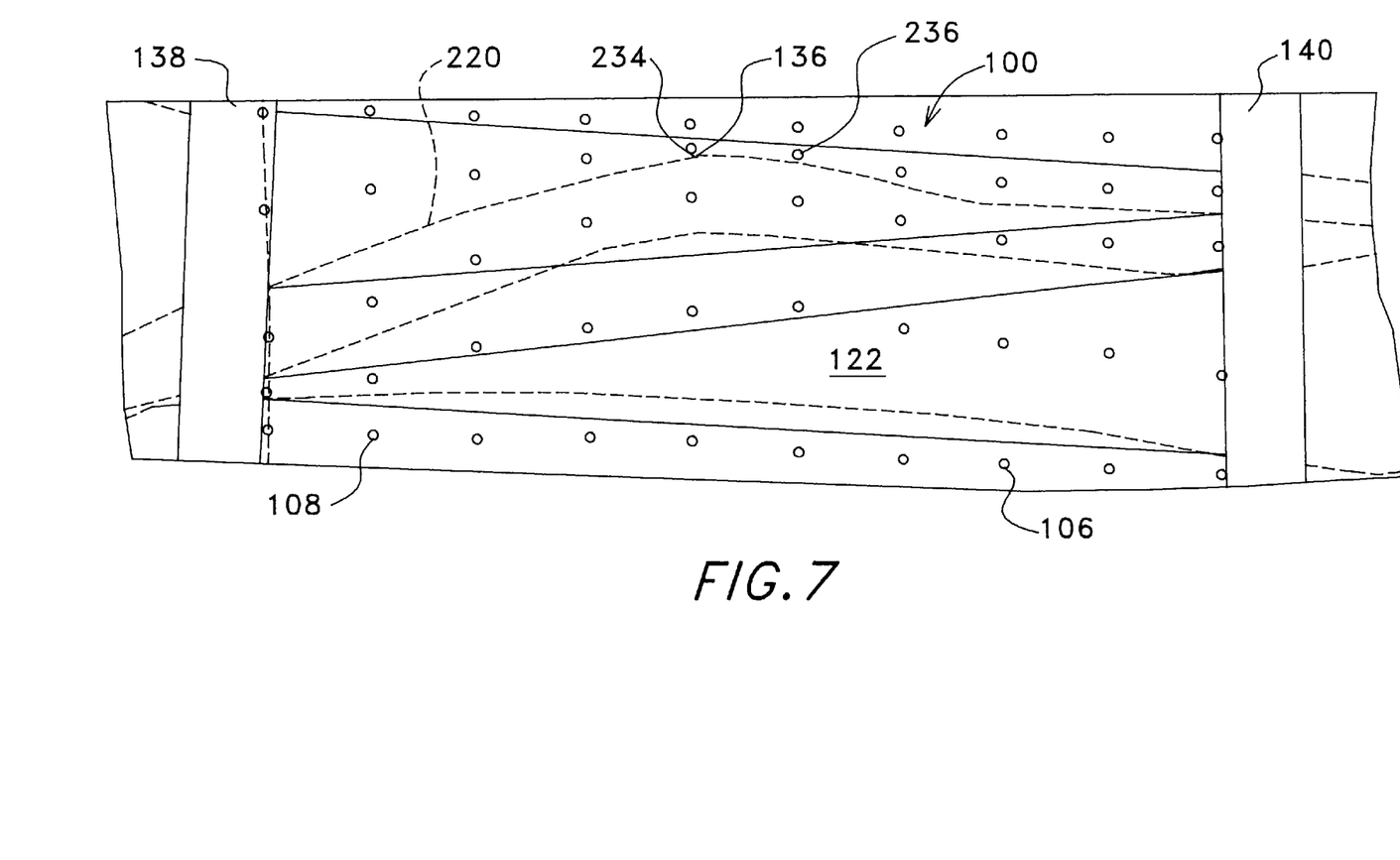
FIG. 7 is a cross-sectional view, in elevation, of the region of FIG. 5 shown here to illustrate the configuration of the node/layer model of the present invention following adjustment of the model's layer boundaries and associated node positions in accordance with reflection data.

Turning to FIGS. 6 and 7, node/layer model 100 is shown once again as it was originally formulated with straight layer boundaries based upon the logs for boreholes 138 and 140. However, the model has been updated based on the boundary information gained from the addition of reflection data in the aforedescribed manner. The relocated layer boundaries are illustrated as dashed lines 220. Comparison of FIG. 7 with FIG. 6 reveals that the nodes which make up each node group 108a–e have been relocated vertically such that they remain within the same layer. For illustrative purposes, the nodes are shown as being vertically centered within the layers. In this regard, the reader will recall that layers 180, like layers 102 of FIG. 2, are vertically homogeneous such that, so long as a particular node group remains within the same layer and its nodes do not move laterally, the seismic characteristics of the layer are not affected. It is to be understood that not necessarily all of the strata boundaries can be located as accurately as is depicted in FIG. 7 based on (i) a particular set of reflection data and (ii) the approximate model which is used in view, for example, of inherent resolution limitations which may be imposed by aperture angle. However, it is submitted that the use of reflection data in the iterative approach of the present invention provides advantages and consequent enhancements in seismic imaging, particularly when coupled with the advantages of node/layer model 100, which have not been seen heretofore.

Returning briefly to the subject of the use of node/layer model 100 in unknown regions, the discussion immediately above relating to the method illustrated in FIG. 4 remains applicable. Of course, processing times may be expected to increase without the benefit of well logs or other such prior knowledge of the region of interest. To the degree that the model is formulated as described above for an unknown (e.g., region 14 of FIG. 2), optimum results may be expected for a particular set of seismic data. In most cases, the layer thickness, for example, two feet, in model 100 is substantially thinner than the actual geologic features which are of interest such that a specific feature may extend across a number of layers in the model. It is also noted that, even in cases where advance information is available, model 100 may be formulated with layers which are substantially thinner than the known features. Such a formulation may be advantageous in cases, for example, where higher vertical resolution is readily available based on aperture angle, where well logs may contain inconsistencies or where well logs are unavailable.

Referring to FIG. 4 and having determined node locations, node values and strata boundaries, a seismic velocity map is produced in step 228. It is not attempted herein to illustrate the appearance of a seismic map corresponding to either of regions 14 FIG. 2) or 122 (FIG. 5) since a monochrome representation of an actual seismic map has been provided (FIG. 3) and due to limited capability in assuring the exact reproduction of subtle, yet important shades which normally appear in such maps and which may be critical to the reader's understanding. Therefore, the expected appearance of a seismic map will be described in relation to figures which have been described above.

Referring to FIGS. 4, 5 and 7, strata boundaries 230 and 232, which are generally horizontal, may be expected to be rather sharply defined as can be appreciated based on the ability of node/layer model 100 in resolving abrupt vertical changes in seismic velocity. With regard to abrupt changes in horizontal seismic velocity, previously described truncation 136 serves to facilitate a discussion of the appearance of the seismic velocity map corresponding to such a feature and produced in accordance with the present invention. Specifically, truncation 136 resides between nodes 234 and 236 (FIG. 7), each of which specifies a respective velocity value. The linear interpolation performed in step 213 horizontally distributes the difference between the assigned velocity values at nodes 234 and 236 smoothly across the distance between the two nodes. One of skill in the art will recognize that, even though an abrupt truncation will not be seen in the corresponding velocity map, a very effective representation nonetheless is provided which indicates that a significant and rapid change has occurred in an identifiable region and depth between boreholes 138 and 140. Moreover, the specific appearance of the region of truncation 136 in the map will be scaled horizontally in an optimum manner in view of the correlation of the node/layer model of the present invention with the characteristics of the seismic data record.

It should be noted that no disadvantages have been found in the use of the method and associated node/layer model of the present invention. As an example, if a region is not well characterized by a layered high vertical resolution model, the horizontal node spacing may be reduced (i.e., more nodes per layer) to a point where the balance between horizontal and vertical mapping resolutions changes in a way which accommodates the region of interest. In the majority of practical applications, however, the present invention produces seismic velocity images having resolutions which are optimized both vertically and horizontally and which are useful in a variety of imaging applications such as, for example, reservoir characterization and monitoring of enhanced-oil-recovery processes such as, for example, steam flooding, water flooding and $CO_2$ flooding. Even more particularly, the usefulness of these images is significant in that the vertical resolution advantageously corresponds with well log resolutions.

It should be appreciated that the concepts of the present invention, as used in the method taught herein, may be applied in a number of different ways by one of skill in the art. Therefore, the present examples and methods are considered as illustrative and not restrictive, and the invention is not to be limited to the details given herein, but may be modified within the scope of the appended claims.

What is claimed is:

1. In a system for establishing a map of the value of a particular characteristic of a subterranean region of ground between two generally vertically extending boreholes from which specific seismic data relating to said particular characteristic is generated, a method comprising the steps of:

a) defining a set of vertically spaced, generally horizontally extending continuous layers within the region between said boreholes;

b) choosing a certain number of node points which are fixed in position horizontally and which are located within the boundaries of each layer, the number of said node points being selected such that the value of said particular characteristic of the subterranean region at each of said points is one which can be determined from said seismic data;

c) using said seismic data, determining the value of said particular characteristic at each node point;

d) within each of said layers, assigning values of said particular characteristic to positions between the nodes of each layer based on the values at the chosen node points within the layer and without regard to the values at node points within any other layer; and e) using all of said values, establishing said map.

2. The method of claim 1 wherein said seismic data is direct arrival traveltime data.

3. The method of claim 2 wherein said direct traveltime data includes a certain number of direct traveltimes across said region and between known positions within said boreholes and wherein said node choosing step includes the step of specifying the total number of nodes as being less than or equal to said certain number of direct traveltimes.

4. The method of claim 1 wherein said particular characteristic is the value of seismic wave propagation velocity within the ground.

5. The method of claim 1 wherein the overall number of layers within said set of horizontally extending layers establishes a vertical mapping resolution of said particular characteristic and wherein the number of nodes chosen within each layer establishes a horizontal mapping resolution of said particular characteristic.

6. The method of claim 5 wherein said layers and said nodes are arranged such that said vertical mapping resolution is substantially greater than said horizontal mapping resolution.

7. The method of claim 1 wherein, for each of said layers, said assigned values of said particular characteristic are determined by linear interpolation between the determined values of said particular characteristic at horizontally adjacent nodes within the layer.

8. The method of claim 1 wherein said seismic data is generated within a particular aperture angle defined by the depth of and positional relationship between said boreholes and including the step of choosing the number of nodes per layer based on said particular aperture angle.

9. The method of claim 8 including the step of assigning a thickness to each layer based on said aperture angle.

10. The method of claim 8 wherein for aperture angles in the range of approximately 40° to 60° no more than ten nodes are assigned to each layer.

11. The method of claim 1 wherein well logs are provided for one or both of said boreholes and including the step of determining the thickness of each of said layers based, at least in part, on said well logs.

12. The method of claim 1 including the step of determining a thickness for each layer based, at least in part, on said seismic data such that a suitable vertical resolution is established for mapping the value of said particular characteristic.

13. The method of claim 1 wherein each layer includes a thickness of two feet.

14. The method of claim 1 wherein the nodes of each layer are evenly spaced across said region.

15. The method of claim 14 wherein nodes within different ones of said layers are vertically aligned.

16. The method of claim 1 wherein each layer includes the same number of nodes.

17. The method of claim 1 wherein layers include different numbers of nodes.

18. The method of claim 1 wherein each layer is vertically homogeneous and horizontally inhomogeneous for use in assigning said particular characteristic to positions between said nodes.

19. The method of claim 1 further comprising the steps of:
(e) performing a predetermined procedure using said values so as to determine new values of said particular characteristic at said nodes and assigning the new values to the nodes;
(f) assigning new values of said particular characteristic to positions between the nodes of each layer based on the new values at the chosen node points within the layer and without regard to the new values at node points within any other layer; and
(g) using all of said new values, reestablishing said map such that a more accurate representation of said particular characteristic is provided within said region.

20. The method of claim 19 including the step of repeating steps (e) and (f) in an iterative manner until such time that the new values of the reestablished map change by less than a predetermined amount as compared with the previous iteration and thereafter performing step (g).

21. The method of claim 19 wherein said predetermined procedure is a ray tracing step.

22. The method of claim 21 wherein said ray tracing step includes the steps of (i) establishing raypaths between said boreholes and (ii) approximating each raypath as a series of linear segments extending between the boundaries of the layers through which that raypath passes wherein each segment is located in an individual layer.

23. The method of claim 22 wherein each raypath includes an overall traveltime which is distributed in portions among its segments and wherein the traveltime portion along each segment of the approximated raypath is determined using values of said characteristic at positions in said map which correspond to the location of that segment.

24. The method of claim 19 including the step of assigning a thickness to each of said layers such that the layers are thin enough to provide a substantially accurate piecewise linear approximation of said raypath over said series of linear segments.

25. The method of claim 19 wherein each layer includes a group of said nodes and including the steps of (i) calculating an average value for the node group of each layer through which a particular raypath passes and (ii) determining bending of said approximate raypath at said boundaries and between said segments in a predetermined way using the average value for each node group.

26. The method of claim 25 wherein said particular raypath includes a first segment in a first layer and a second segment in an adjacent second layer, said first and second segments joining one another at a first point along a boundary which is defined between the first and second layers and wherein bending of said particular raypath at said first point is established in said predetermined way by using a first average of the values for the node group within the first layer and a second average of the values for the node group within the second layer.

27. In a system for mapping a subterranean region of ground in which crosswell seismic data is provided which characterizes said subterranean region between two boreholes, said seismic data including at least two different types of data, a method comprising the steps of:
a) establishing an approximate model of said region using one specific type of said data; and
b) adjusting the approximate model by using the approximate model in combination with a different specific type of said data so as to establish a more definitive model of said region.

28. The method of claim 27 wherein said one specific type of data is direct arrival traveltime data.

29. The method of claim 27 wherein said different specific type of said data is reflection data.

30. In a system for mapping a subterranean region of ground in which crosswell seismic data is provided which characterizes said subterranean region between two boreholes, said seismic data including reflection data and other specific data, a method comprising the steps of:
a) establishing an approximate model of said region using said specific data;
b) determining the locations of reflective structures within said region using said approximate model and said reflection data; and
c) adjusting the approximate model based on the determined locations of said reflective structures within said region so as to establish a more definitive model of said region.

31. The method according to claim 30 wherein said region includes generally horizontally extending strata having boundaries which define said reflective structures and wherein said approximate model is established by establishing within said approximate model a set of generally horizontally extending continuous layers corresponding to said generally horizontally extending strata within said region between said boreholes and wherein said step of adjusting the approximate model includes the step of changing the locations of boundaries between said layers based upon the determined locations of said reflective structures such that the layer boundaries of the model correspond with the actual strata boundaries.

32. The method of claim 30 wherein each layer is vertically homogeneous and horizontally inhomogeneous in forming said approximate model.

33. The method of claim 30 wherein said step of establishing the approximate model includes the step of mapping an estimated wave propagation velocity associated with each point within said region using said specific data.

34. The method of claim 30 further comprising the steps of iteratively repeating steps (b) and (c) using the adjusted approximate model until such time that the adjustments made in step (d) are less than a predetermined percentage.

35. The method of claim 30 wherein said step for establishing said approximate model includes the steps of (i) defining a set of vertically spaced, generally horizontally extending continuous layers within the region between said boreholes, (ii) choosing a certain number of node points which are fixed in position horizontally and which are located on or within the boundaries of each layer, the number of said node points being selected such that the value of said particular characteristic of the subterranean region at each of said points is one which can be determined from said specific data, (iii) using said specific data, determining the value of said particular characteristic at each node point, (iv) within each of said layers, assigning values of said particular characteristic to positions between the nodes of each layer based on the values at the chosen node points within the layer and without regard to the values at node points within any other layer, and (v) using all of said values, establishing said approximate model.

36. The method of claim 30 wherein said step for establishing said approximate model further includes the steps of (vi) performing a predetermined procedure using said approximate model so as to determine new values of said particular characteristic at said nodes and (vii) assigning new values of said particular characteristic to positions between the nodes of each layer based on the new values at the chosen node points within the layer and without regard to the new values at node points within any other layer, and (viii) using all of said new values, establishing said approximate model such that a more accurate representation of said particular characteristic is provided within said region.

37. The method of claim 36 wherein said predetermined procedure is a ray tracing step.

38. The method of claim 36 including the step of repeating steps (vi), (vii) and (viii) in an iterative manner until such time that the new values which are assigned to said nodes change by less than a predetermined amount as compared with the last iteration.

39. The method of claim 30 wherein said specific data includes direct arrival traveltime data and wherein said direct arrival traveltime data is used to establish the approximate model.

40. The method of claim 30 wherein said reflective structures are located using a ray tracing step.

41. The method of claim 40 wherein said ray tracing step includes the steps of (i) establishing raypaths between said boreholes and (ii) approximating each raypath as a series of linear segments extending between the boundaries of the layers through which that raypath passes wherein each segment is located in an individual layer.

42. The method of claim 41 wherein each raypath includes an overall traveltime which is distributed in portions among its segments and wherein the traveltime portion along each segment of the approximated raypath is determined using values of said characteristic at positions in said adjusted approximate model which correspond to the location of that segment.

43. The method of claim 41 including the step of assigning a thickness to each of said layers such that the layers are thin enough to provide a substantially accurate piecewise linear approximation of said raypath over said series of linear segments.

44. The method of claim 41 wherein each layer includes a group of said nodes and including the steps of (i) calculating an average value for the node group of each layer through which a particular raypath passes and (ii) determining bending of said approximate raypath at said boundaries and between said segments in a predetermined way using the average value for each node group.

45. The method of claim 44 wherein said particular raypath includes a first segment in a first layer and an adjacent second segment in a second layer, said first and second segments joining at a first point along a boundary which is defined between the first and second layers and wherein bending of said particular raypath at said first point is established in said predetermined way by using a first average of the values for the node group within the first layer and a second average of the values for the node group within the second layer.

46. In a system for mapping the value of a wave propagation characteristic for a subterranean region of ground in which crosswell seismic data is provided which characterizes said subterranean region between two skewed boreholes, said data including traveltimes which are associated with raypaths between said boreholes, a method comprising the steps of:
  a) establishing the three dimensional orientation and position of each borehole within the ground and thereby establishing the skewness of the boreholes with respect to one another;
  b) determining the raypaths which extend from known transmission positions in said first borehole to known measurement positions in said second borehole and identifying the traveltime associated with each raypath;
  c) establishing an approximate length for each raypath by assuming that said first and second boreholes are vertically oriented in the ground;
  d) determining the actual length of each raypath based upon the established three dimensional orientation and position of each borehole;
  e) compensating for the actual length of each associated raypath by multiplying the traveltime with the ratio of said actual length to said approximate length so as to determine a compensated traveltime for that raypath; and
  f) determining the value of said characteristic within said region using the compensated traveltimes.

47. In a system for establishing a map of the value of a particular characteristic of a subterranean region of ground between two generally vertically extending boreholes from which seismic data is generated, a method comprising the steps of:

a) defining a set of vertically spaced, generally horizontally extending continuous layers within the region between said boreholes;

b) choosing a certain number of node points which are fixed in position horizontally and which are located within the boundaries of each layer such that the nodes remain with the layer in which they are initially positioned, the number of said node points being selected such that the value of a particular characteristic of the subterranean region at each of said points is one which can be determined from said seismic data;

c) using a first portion of said seismic data, determining the value of said particular characteristic at each node point;

d) within each of said layers, assigning values of said particular characteristic to positions between the nodes of each layer based on the values at the chosen node points within the layer and without regard to the values at node points within any other layer so as to establish an approximate model;

e) performing a direct arrival ray tracing step in an iterative manner using said approximate model until such time that converged values are determined for said nodes;

f) assigning said converged values to the nodes;

g) assigning new values of said particular characteristic to positions between the nodes of each layer of the approximate model based on the converged values at the chosen node points within the layer and without regard to the converged values at node points within any other layer;

h) performing a reflection ray tracing step using the adjusted approximate model and the second portion of said seismic data to establish more definitive locations of said layer boundaries;

i) adjusting the boundaries of the layers within said approximate model to said more definitive locations; and j) generating said map using the adjusted approximate model and the adjusted, more definitive locations of said layer boundaries.

48. The method of claim 47 further comprising the step of repeating steps (e) through (i) in an iterative manner until such time that the adjusted layer boundaries change by less than a predetermined percentage and, thereafter, performing step (j) of generating said map.

\* \* \* \* \*